April 9, 1957 G. TACCONI 2,787,993
ROTARY VALVE DISTRIBUTORS FOR PISTON ENGINES
Filed Sept. 9, 1954 4 Sheets-Sheet 1
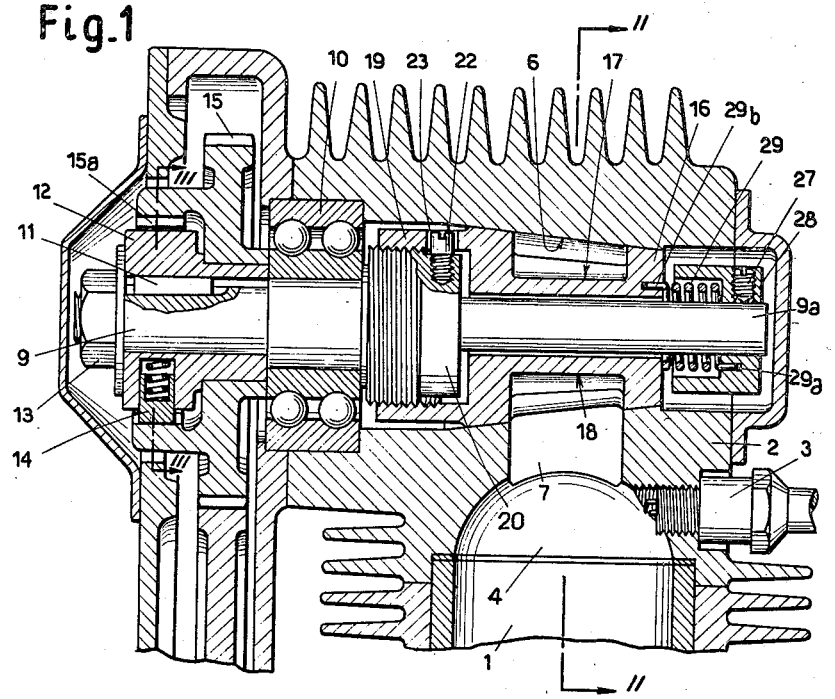
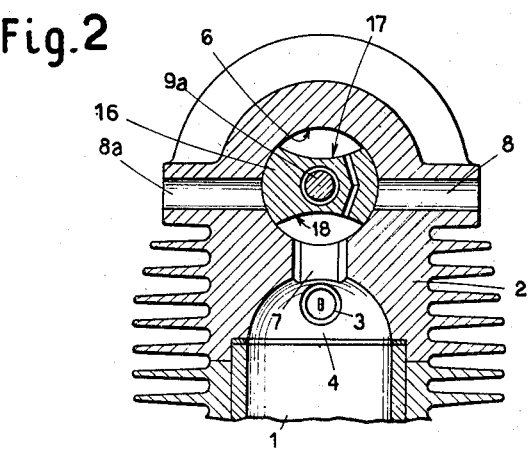
INVENTOR:
GUIDO TACCONI
BY:

April 9, 1957   G. TACCONI   2,787,993
ROTARY VALVE DISTRIBUTORS FOR PISTON ENGINES
Filed Sept. 9, 1954   4 Sheets-Sheet 2

INVENTOR:
GUIDO TACCONI
BY:

April 9, 1957 G. TACCONI 2,787,993
ROTARY VALVE DISTRIBUTORS FOR PISTON ENGINES
Filed Sept. 9, 1954 4 Sheets-Sheet 3

INVENTOR:
GUIDO TACCONI
BY:

April 9, 1957  G. TACCONI  2,787,993
ROTARY VALVE DISTRIBUTORS FOR PISTON ENGINES
Filed Sept. 9, 1954  4 Sheets-Sheet 4

INVENTOR:
GUIDO TACCONI
BY:

United States Patent Office

2,787,993
Patented Apr. 9, 1957

2,787,993
ROTARY VALVE DISTRIBUTORS FOR PISTON ENGINES

Guido Tacconi, Castello, Florence, Italy

Application September 9, 1954, Serial No. 455,040

12 Claims. (Cl. 123—190)

This invention relates to rotary valve distributors for piston engines. More particularly, the invention relates to the use of such distributors for controlling the feed to and exhaust from the cylinders of heat engines, compressors, pumps and other machines provided with a cyclically variable volume chamber, the distributors being of the type including a member rotating relative to an appropriate seat, both the member and seat being, for example, conical.

In such distributors sealing of the inlet and exhaust ports must be maintained at the high pressures which occur cyclically in the cylinders, while at the same time the pressure between the contacting surfaces of the rotating member and the seat, which are in relative motion, must be kept within appropriate limits, even when the members are also thermally stressed and subjected to variations of the coefficient of friction during operation.

The invention relates to a rotary valve distributor or timing gear which avoids seizure, keeps the pressure between the contacting surfaces within predetermined adjustable limits and furthermore also offers the possibility of absorbing the cyclically variable axial stresses (due to the variable pressure existing in the cylinder) applied to shoulder members of the rotating member, without compromising the operation of the unit.

According to the invention, the distributor comprises a distributor member rotating in, and relatively to, a seat provided with openings communicating with the cylinder or cylinders, together with inlet and exhaust openings, a dragging member having a predetermined axial position relative to the seat and coupled to said distributor member through a helical coupling, that is through a screw thread, and through a torsion spring or other resilient member which transmits by means of its inherent resilience the desired torque for the rotation of the distributor member relative to its seat, the action of the torsion spring or other resilient member tending to rotate the distributor member relative to the dragging member in the direction whereby said distributor member moves closer to its seat, while the increasing friction between said distributor member and its seat is opposed to the action of said spring and thus tends to rotate said distributor member in a direction whereby it is detached from its seat. The arrangement of these two mutually opposed actions generates a balance which automatically keeps the contact friction between the rotary portion and the stationary portion substantially constant, even when, owing to contingent causes—both due to thermal stresses and stress produced by any other cause—this friction should tend to increase.

When, owing to any cause, the friction tends to increase, the torque required for the dragging and thus the deformation of the elastic member increases, and this effects a slight angular displacement between the two members and therefore—through the helical coupling—also effects an axial displacement which tends to detach the distributor member from its own seat, until the friction regains its predetermined value.

According to a preferred embodiment, the distributor member comprises a truncated conical member housed in a conical seat and coupled to the dragging member by a screw coupling or a torsion spring or a similar resilient connection.

The system operates both when the distributor member, dragged by the dragging member, rotates relative to the stationary seat, and also when the seat rotates and said dragging member remains stationary; said dragging member in this latter case having the function of preventing rotation of the distributor member, which tends to be dragged by friction away from the rotating seat.

The following description and the accompanying drawings illustrate some embodiments of the invention.

In these drawings:

Fig. 1 is a longitudinal vertical section of one embodiment;

Figs. 2 and 3 are transverse sections along the lines II—II and III—III of Fig. 1;

Figure 3:
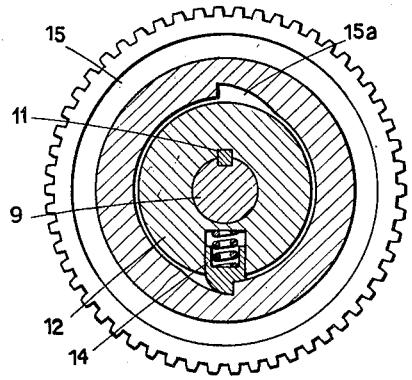
Figure 4:
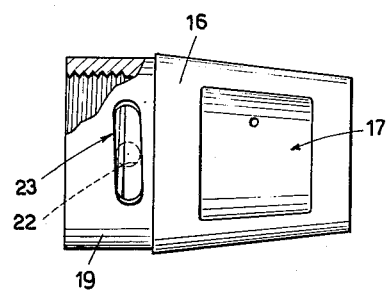
Fig. 4 is a side elevation of the distributor member only.

Referring firstly to Figs. 1 to 4, a cylinder 1 is surmounted by a block 2 wherein there is the seat for a sparking plug 3 which is introduced into the head 4. The block 2 is provided with a bore perpendicular to the axis of the cylinder, which bore forms a truncated conical seat 6 communicating through an opening 7 with the head 4 of the cylinder 1, whilst openings 8, 8a (Fig. 2) arranged on opposite sides respectively of the passage 7 form the exhaust and inlet openings. A shaft 9 mounted in a bearing 10 extends through the bore forming the conical seat 6, the shaft 9 being coupled by a key 11 to a collar 12 which together with the inner race of the bearing 10 is locked against a shoulder of the shaft 9 by means of a nut 13. A spring-urged pin 14, provided with a toothed end, is housed in a radial hole in collar 12; the pin 14 may engage one of two diametrally opposite triangular recesses 15a, internally cut in an annular lug of a gear 15 which is mounted between the collar 12 and the bearing 10 but is free relative to these two members. The gear 15 is driven from the drive shaft, with a 4:1 ratio in this embodiment; the arrangement is substantially similar to a free-wheel device.

The shaft 9 is provided with an enlarged portion 20 which is located practically at the half of the bore in the block 2, a smaller diameter portion 9a of the shaft 9 extending in correspondence with the conical seat 6. A conical distributor member 16 is housed in the conical seat 6, said member 16 being arranged around the portion 9a of the shaft 9 and being provided with two recesses 17—18 which by rotation of the distributor member 16 successively place the opening 7 in communication with the exhaust and inlet openings 8, 8a. The two recesses 17, communicate through a small hole to effect a radial balance.

A cup shaped lug 19 on the member 16 surrounds the enlarged portion of the shaft 9, the member 16 and the shaft 9 being helically coupled by screw threads consisting of several rapid pitch threads cut in the central enlarged portion 20 of the shaft 9 and on the inside of the lug 19. A pin 22 which projects into a groove 23 cut in the cup shaped lug 19 is secured in the shaft 9, in order to restrict the relative angular displacements between the shaft 9, forming the dragging member, and the member 16; said groove 23 extends helically and follows the trend of the screw threads (see also Fig. 4). A collar 28 is secured by means of a screw 27 to the end of the portion 9a of the shaft 9. The end 29a of a helical spring 29 is fixed to the collar 28 and the other end 29b of the spring is fixed to the distributor member 16, the spring 28 forming a torsional spring connection between the shaft 9 and the distributor member 16 designed to establish a torque whose axis coincides with the axis of the distributor.

The motion is transmitted from the central shaft of the machine through the gear 15 and the freewheel device 14, 15a to the shaft 9 and thence through the spring 29 to the distributor member 16. Dependent upon the stress required to drag the member 16 and overcome its friction with the seat 6, the spring 29 is slightly or heavily deformed which determines the relative angular displacement between the shaft 9 and the distributor member 16. These two latter members are helically coupled, and the relative angular displacements are transformed into axial displacements of the member 16 relative to the shaft 9 and thus relative to the conical seat 6. Owing to the direction of the thread, when the torque required for the dragging of the member 16 increases, that is, when the friction increases, the spring 29 is subjected to a heavier deformation and thus to a consequent relative angular displacement between the two members; the member 16 is thus subjected to an axial displacement which tends to detach it from the seat 6 thereby decreasing the friction until the deformation of the spring 29 is thus automatically brought back substantially to the normal value, therefore maintaining the balance. In fact, while the spring 29 tends to coil and therefore bring the conical member 16 nearer to the seat 6, the friction arising from the contact of the member 16 with its seat 6, in opposition to the spring, tends to screw said conical member and therefore detach it from its seat. Cyclically variable axial stresses (due to the action of the varying cylinder pressure acting on the distributor member) are cushioned through the helical coupling to the dragging member 9 without altering the automatic adjustment of the friction.

The angular position of the shaft 9 with respect to the central driving shaft of the machine, and therefore the valve timing, is assured by the presence of the two recesses 15a which engage the pin 14; any reversed rotation of the central driving shaft relative to the usual direction is not transmitted to the shaft 9, so that locking of the member 16 in the seat 6 is avoided.

The spring 29 is initially compressed through rotation of the collar 28 and locking of the latter to the shaft 9 is effected by the pressure screw 27. The distributor member 16 is restrained by the pin 22 which stops the rotation of said member by engagement with the bottom of the groove 23 thus facilitating assembly, the pin 22 being located in an intermediate position in the groove 23 in normal balanced operation. The first compression imparted to the torsional spring 29 adjusts the value of the friction between the member 16 and its seat 6, so that by varying this compression it is possible to vary the specific pressure between the two relatively movable surfaces.

Figure 5:
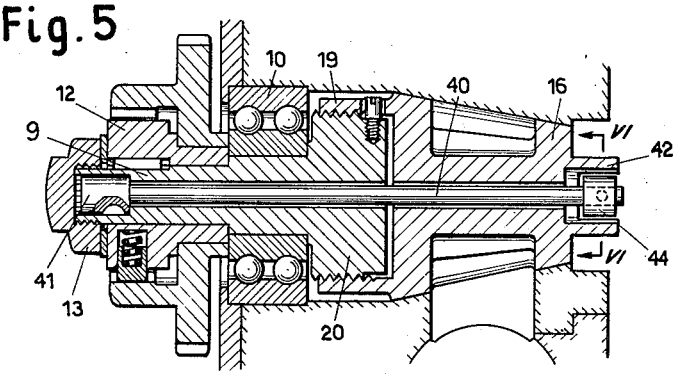
Fig. 5 is a similar view to Fig. 1 of a second embodiment.
Figure 6:
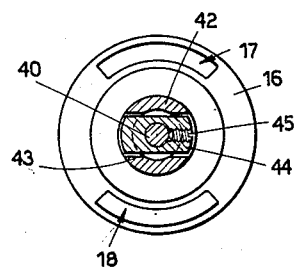
Fig. 6 is a section along the line VI—VI of Fig. 5.

In the second embodiment shown in Figs. 5 and 6, the shaft 9 is not provided with the smaller diameter portion 9a and is axially bored in order to house a torsion bar 40 which is secured at 41 to the shaft 9 and extends through an axial bore in the member 16. The member 16 is provided with a projecting annular rim 42, having two diametrically opposite slots 43 (Fig. 6), in which a crosspiece 44 is housed, the crosspiece 44 being secured by a pressure screw 45. The previously loaded torsion bar 40 replaces the torsion spring 29 of the previous embodiment. The crosspiece 44 drives the member 16, which can slide axially relative to the crosspiece, the elastic torsional deformations of the bar 40 determining the relative angular displacement between the shaft 9 and the member 16.

Figure 7:
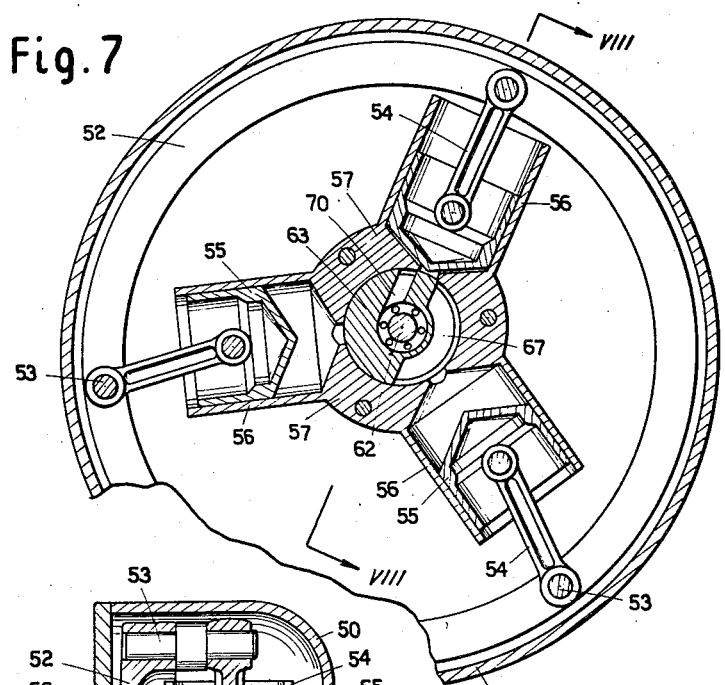
Fig. 7 is a transverse section of a third embodiment in which the invention is applied to compressor provided with radial cylinders formed in a rotating block.
Figure 8:
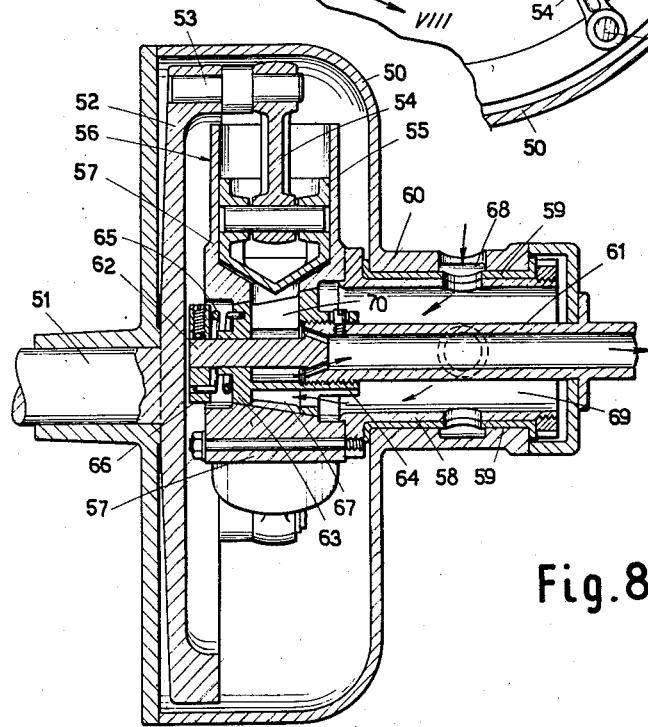
Fig. 8 is a section about along the line VIII—VIII of Fig. 7.

In the embodiment shown in Figs. 7 and 8, a central rotating distributor valve according to the invention, is applied to a compressor which includes a rotating block carrying the radially arranged cylinders. A disc 52 integral with the shaft 51 carries pins 53 securing the connecting rods 54 of the pistons 55, the disc 52 rotating in the casing 50. The pistons 55 reciprocate in the cylinders 56 which are formed integrally with the block 57, the latter being provided with a sleeve lug 58 mounted on a bearing 59 which is housed on a tubular support 60 extending from the casing 50. The block 57 rotates on the bearing 59 whose axis is eccentric to the axis of the shaft 51, the block 57 being dragged by the drive shaft 51. Owing to the eccentricity of the rotational axis, the pistons 55 reciprocate in the cylinders 56. A stationary rigid pipe 61 formed at one end with a shaft 62 extends through the inside of the sleeve 58 and carries a conical distributor member 63, housed in a corresponding conical seat formed in the rotating block 57. The outlets from the cylinders open into said seat. The distributor member 63 is connected in a predetermined axial position to the pipe 61, end shaft 62, by a narrow-pitch screw thread 64 and by a torsion spring 65 which re-acts between the member 63 and a ring 66 which is secured to the end of the shaft 62, the ring 66 retaining the spring 65 in compression. An opening 67 in the distributor member 63 extends over an arc of slightly less than 130° and serves as the inlet opening, fluid passing to the opening 67 from the port 68 through the jacket 69. A second opening 70 allows compressed fluid to exhaust from the cylinders into the pipe 61.

In this embodiment the distributor member 63 is substantially stationary and the conical seat formed in the block 57 rotates relatively thereto. However, the automatic adjustment occurs in a similar way to the previous embodiments, since the spring is deformed, owing to the torque required to overcome the friction between the seat and the member 63, the torque tending to drag the member 63.

Figure 9:
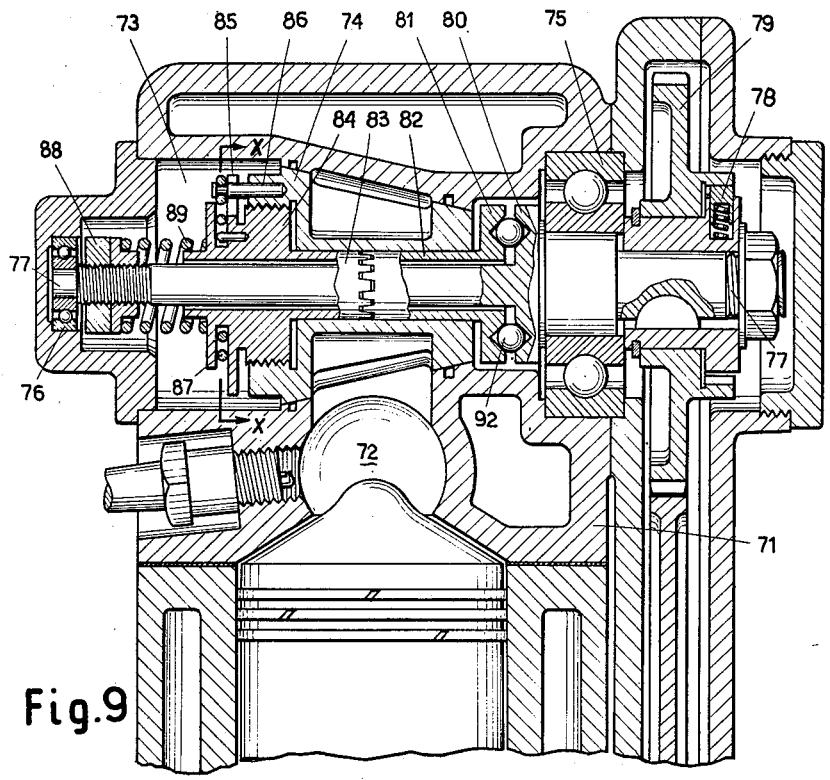
Fig. 9 is a longitudinal section of a fourth embodiment.
Figure 10:
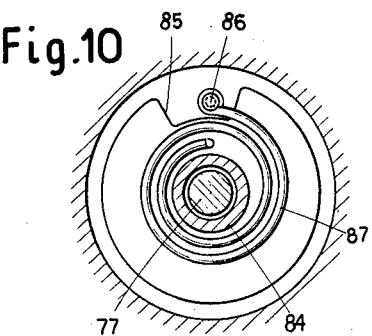
Fig. 10 is a section along the line X—X of Fig. 9.
Figure 11:
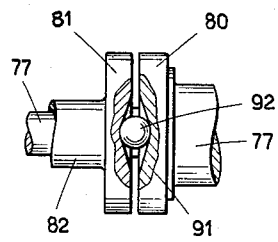
Fig. 11 is a side view of a detail of Fig. 9.

In the embodiment shown in Figs. 9 to 11 there is provided a second device for automatic adjustment through which the motion of relative rotation of the distributor member with respect to its own seat is transmitted. This second automatic adjustment device begins its operation when the helical coupling adjustment is not adequate, and it allows the conical member to be raised by a large amount.

The head 71 is formed with a through cavity 73, a conical seat for the conical member 74 and a chamber 72. A shaft 77 is mounted on the bearings 75 and 76 and is rotated, through the spring-urged pin 78 which acts as a freewheel, by a gear 79 which is driven from the main shaft (not shown). The shaft 77 has a collar 80 which faces a disc or plate 81 which is integral with a sleeve 82. The sleeve 82 surrounds the smaller portion of the shaft 77 and extends through the inside of the axial bore of the conical member 74. The end of the sleeve 82 is provided with teeth and is coupled with a similarly toothed end of a second sleeve 83, which also surrounds the shaft 77 and is integral with an enlarged portion 84, the latter being provided with an external screw thread which engages an internal screw thread provided in the member 74.

The portion 84 is provided with a notched sector plate 85, through the notch of which a pin 86 fixed to the member 74 extends. The ends of a spiral spring 87 are fixed to the pin 86 and the portion 84, the spring 87 being designed to drag the conical member 74 and determine the relative angular displacements between the portion 84 and the member 74 when the torque required to rotate the member 74 varies.

A shoulder 88 is formed, for example, by a nut and locknut in order to be adjustable, and a spring 89 lies against this shoulder and tends to push the members 84, 83 and 82 towards the right hand side when loooking at the drawing, tending to bring the disc 81 and the enlarged portion 80 together. Both the disc 81 and the portion 80 are provided with corresponding V-shaped recesses 91 on their adjacent surfaces and balls 92 forming rolling elements are introduced into said recesses. The spring 89 thus presses the disc 81 against the balls 92 and the latter against the portion 80 which has a fixed axial position.

Under normal conditions, the action of the spring 89 is such as to prevent relative angular displacement between the shaft 77 and the disc 81 so that the rotary motion, which is transmitted from the wheel 79 to the shaft 77, is in its turn transmitted from the latter to the sleeves 82—83 and then to the conical member 74 through the spring 87. When, for any reason, the adjustment due to the screw threaded coupling between the members 84 and 74 is not sufficient and the torque required for the rotation of the member 74 increases, the axial component of the increased stress transmitted through the balls 92 overcomes the action of the spring 89 and thus a relative rotation occurs between the portion 80 and the disc 81 with a rolling of the balls 92 on the inclined surfaces of the recesses 91. This results in an axial movement of the assembly of the members 82—83 and 74, towards the left hand side as viewed in Fig. 9, with compression of the spring 89.

This second means of automatic adjustment allows a major safety of operation and also permits the screw-threaded coupling between the members 84 and 74 to be of small pitch, which may be preferable in order to obtain a regular operation of the first automatic adjustment means.

The drawing only illustrates diagrammatic embodiments of the invention, which may be varied in form and arrangement. For example, referring to Figs. 9 to 11, there could be provided rollers mounted on one of the members, such as the portion 80 and rolling inclined surfaces, for example V-shaped surfaces, on the flange 81.

What I claim is:

1. A rotary valve distributor comprising a distributor member rotating relatively to a seat which is provided with an opening communicating with a corresponding cylinder, and is also provided with inlet and exhaust openings, a dragging member which has a predetermined axial position relative to the seat, a screw coupling between said dragging member and said distributor member, a resilient connection between said dragging member and said distributor member, the screw coupling between the two members being such that their relative angular displacement, due to a heavier deformation of the resilient connection owing to greater friction between the distributor member and its seat, effects an axial displacement of the distributor member which tends to raise it from its seat until the friction is brought back to its normal value.

2. A distributor according to claim 1, wherein the resilient connection is provided by a helical spring having its geometric axis coincident with the axis of the distributor.

3. A distributor according to claim 1, wherein the resilient connection is provided by a torsion bar having its geometric axis coincident with the axis of the distributor.

4. A distributor according to claim 1, wherein the screw coupling is a rapid pitch screw thread having several starts.

5. A distributor according to claim 1 and further comprising means for adjusting the deformation of the resilient connection in order to confer an initial predetermined friction between the seat and the distributor member and thus the predetermined friction torque.

6. A distributor according to claim 1 and further comprising means designed to limit the relative angular displacement between the dragging member and the distributor member, said means including a helical groove or notch co-operating with a pin.

7. A distributor according to claim 1 and further comprising a freewheel device capable of transmitting drive only in predetermined and restricted angular position, said device being arranged between the dragging member and a member which transmits the motion thereto, with the purpose of avoiding the transmission of drive in a reversed direction to the distributor member.

8. A distributor according to claim 7, wherein said freewheel device comprises a spring-urged tooth on one of two members of the freewheel device and at least a notch having a predetermined angular position on the other member of the freewheel device, said tooth being adapted to engage in said notch.

9. A distributor according to claim 1, further comprising an automatic adjustment device, through which the motion of rotation is transmitted in order to drive said dragging member, which in its turn rotates the distributor member relative to its seat, said automatic adjustment device being designed to raise said distributor member from its seat by a large amount when the torque increases beyond a predetermined limit.

10. A distributor according to claim 9, wherein said automatic adjusting device includes two members having opposed faces provided with rolling surfaces inclined with respect to the rotational axis of the members, rolling elements which roll on said inclined surfaces, and resilient means urging said two members towards one another with said rolling elements therebetween, the torque for the rotation of the distributor member relative to its seat being transmitted through said rolling elements.

11. A distributor according to claim 1, wherein the distributor member is rotating in a stationary seat.

12. A distributor according to claim 1, wherein said seat is centrally cut in a rotating block which carries cylinders in a radial arrangement cooperating with pistons which are controlled by a member rotating on an axis eccentric to the geometrical axis of rotation of the cylinder block, said dragging member being stationary and coaxial with the rotating block.

References Cited in the file of this patent

UNITED STATES PATENTS

| 1,153,708 | Russell | Sept. 14, 1915 |
| 1,166,939 | Russell | Jan. 4, 1916 |

FOREIGN PATENTS

| 291,344 | Great Britain | June 21, 1928 |